C. W. CASTO.
BOX FLAP GLUING AND SEALING MACHINE.
APPLICATION FILED MAR. 6, 1914.
1,105,256.
Patented July 28, 1914.
2 SHEETS—SHEET 1.
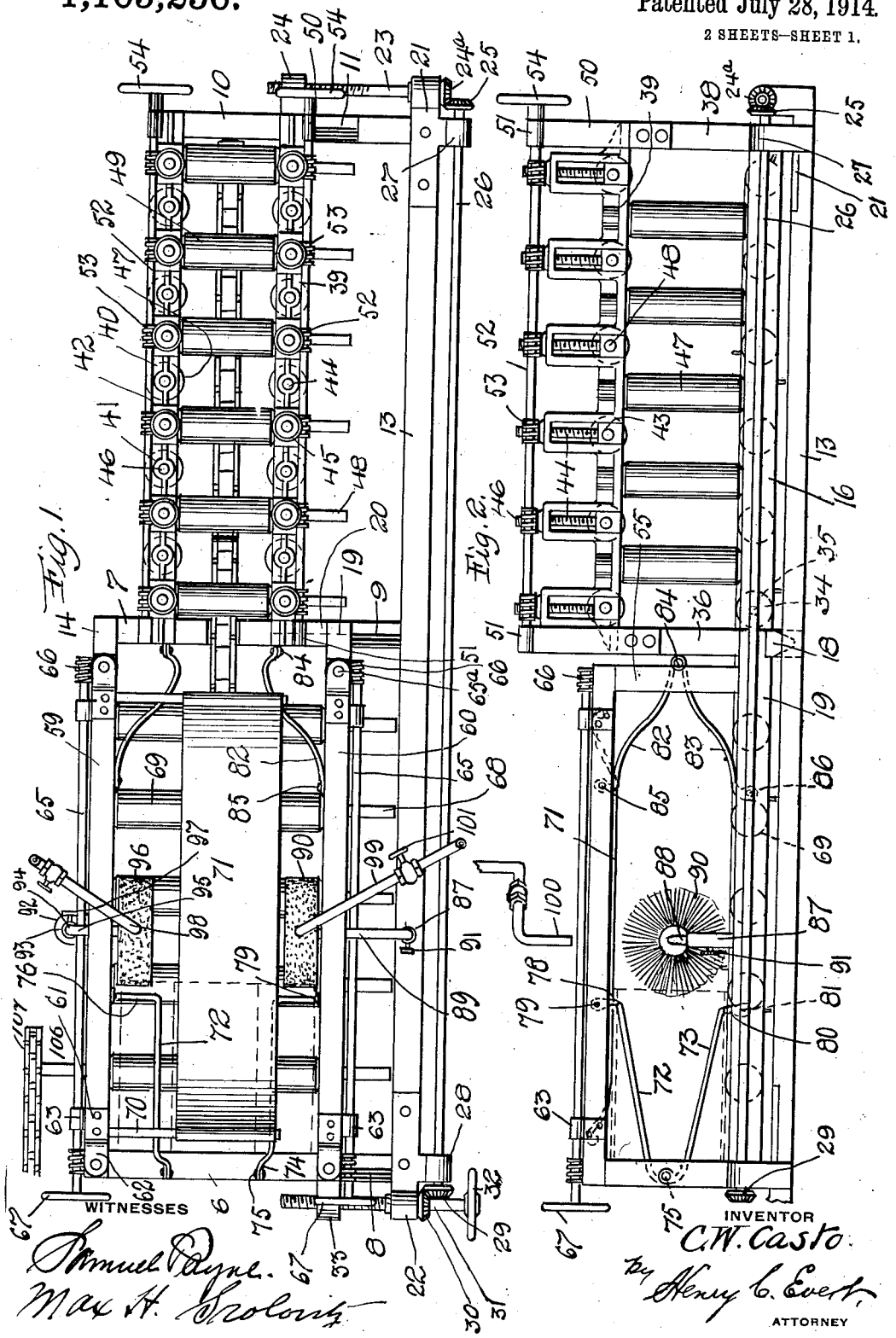
WITNESSES
Samuel Payne
Max H. Srolovitz
INVENTOR
C. W. Casto
by Henry C. Evert
ATTORNEY

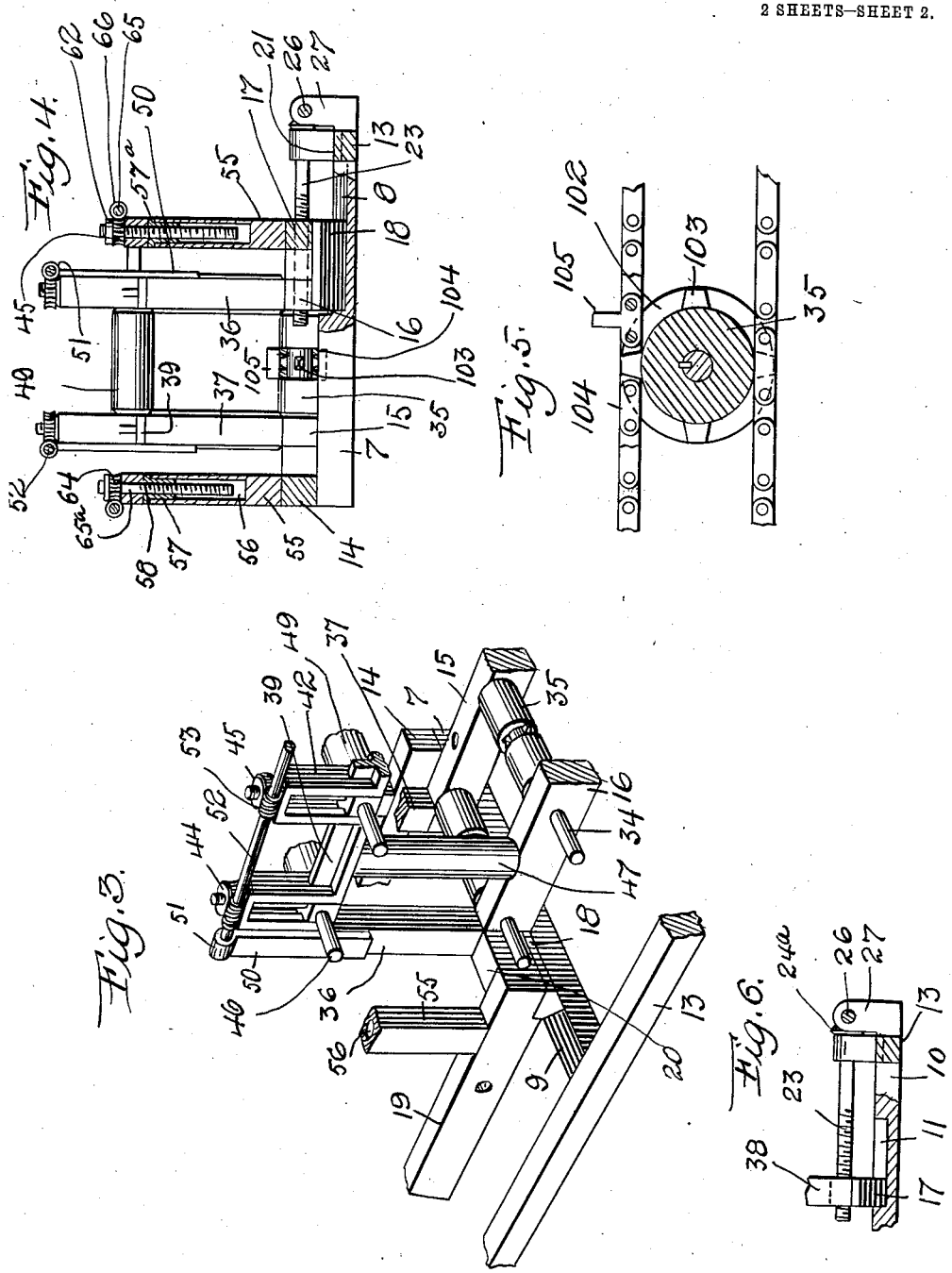

UNITED STATES PATENT OFFICE.

CHARLES W. CASTO, OF WASHINGTON, PENNSYLVANIA, ASSIGNOR OF ONE-HALF TO HENRY FINKEL, OF WASHINGTON, PENNSYLVANIA.

BOX-FLAP GLUING AND SEALING MACHINE.

1,105,256. Specification of Letters Patent. Patented July 28, 1914.

Application filed March 6, 1914. Serial No. 823,040.

*To all whom it may concern:*

Be it known that I, CHARLES W. CASTO, a citizen of the United States of America, residing at Washington, in the county of Washington and State of Pennsylvania, have invented certain new and useful Improvements in Box-Flap Gluing and Sealing Machines, of which the following is a specification, reference being had therein to the accompanying drawing.

This invention relates to a box flap gluing and sealing machine, and has for its object to provide a machine in a manner as hereinafter set forth, for gluing and sealing the flaps of paper boxes or cartons.

Further objects of the invention are to provide a box flap gluing and sealing machine provided with means, in a manner as hereinafter set forth, for adjusting the machine to provide for different size of paper boxes and cartons.

Further objects of the invention are to provide a machine for the purpose set forth which is simple in its construction and arrangement, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a top plan view of a machine in accordance with this invention, Fig. 2 is a side elevation, Fig. 3 is a perspective view, broken away, Fig. 4 is a transverse section, Fig. 5 is a detail illustrating the conveyer, and Fig. 6 is a detail.

Referring to the drawings in detail, 6 and 7 denote a pair of supporting members, the former having a V-shaped groove 8 in its upper face and the latter having a V-shaped groove 9 in its upper face. Extending parallel to the member 7 and spaced therefrom as well as being of less length than the member 7, is a supporting member 10 provided with a V-shaped groove 11 in its upper face.

The members 6, 7 and 10 are connected together by a longitudinally extending bar 13 and the members 6 and 7 are connected together by a longitudinally extending bar 14, which is of less length than the bar 13. The member 7 is connected to the member 10 by a longitudinal bar 15 and arranged parallel to the bar 15 is a longitudinal bar 16, which is secured at one end to a slide 17 movable in the groove 11. The other end of the bar 16 is connected to a slide 18, which travels in the groove 9. The slide 18 is connected by a bar 19 to a slide traveling in the recess 8.

Projecting from each end of the bar 13 are bearings 21 and 22 and journaled in and projecting from the bearing 31 is a threaded shaft 23, which has its threads engaging with the threads of an interiorly threaded sleeve 24 carried by the slide 17. The shaft 23 carries a beveled gear 24$^a$, which meshes with the beveled gear 25 carried by a countershaft 26, which is journaled at one end in a bearing 27, the latter projecting from the bar 13. The countershaft 26 is also journaled in a bearing 28 which projects from the bar 13 and said countershaft has a beveled gear 29 which meshes with the beveled gear 30 carried by a shaft 31, the latter being journaled in the bearing 22. The shaft 31 in its outer end is provided with a hand wheel 32 and is provided at its inner end with threads which engage with the threads of an interiorly threaded sleeve 33 carried by the slide 20.

The slide 18 provides what may be termed a coupling means between the bars 16 and 19 so that said bars will be adjusted in unison. The adjusting of the bars 19 and 16 is had through the medium of the shaft 31, which when revolved by the hand wheel 32 will impart a like motion to the shaft 23 and as the threads of the shaft 23 and 31 engage with the threads of the collars 34 and 33, it is obvious that the bars 16 and 19 will be adjusted and in a direction depending on the direction in which the hand wheel 32 is revolved.

Journaled in the bars 15 and 16 are the shafts 34 of a series of transversely extending rollers 35. The shafts 34 project from the bar 16 a sufficient distance so that when the said bar 16 is adjusted outwardly, the shafts 34 of the rollers 35 will be supported by the bars 15 and 16.

Secured to the slide 18 is a vertically disposed upright 36, secured to the bar 15 and opposing the upright 36 is a vertically disposed upright 37 and secured to the rear ends of the bars 15 and 16 is an upright 38 and these latter are arranged in alinement with the uprights 36 and 37. The upright 36 is connected to one of the uprights 38 by a longitudinally extending member 39 which is arranged parallel to the bar 16 and the upright 37 is connected to the other upright 38 by a longitudinally extending member 40 which is arranged parallel to the bar 15. As the members 39 and 40 are of like construction, but one will be described, the description of one applying to the other. The member 39 as well as the member 40, is provided with a series of bearings 41 and a series of integral frames 42 between each pair of which is arranged a bearing 41. Arranged in each of the frames 42 is a vertically adjustable bearing 43 which is provided with an adjusting screw 44, the latter extending through the top of the frame and formed with a worm gear 45.

Journaled in the bars 15 and 16 and in the bearings 41 are the shafts 46 of vertically disposed rollers 47 and journaled in the bearings 43 are shafts 48 of transversely extending rollers 49, which are arranged parallel to the rollers 45. The shafts 48 project outwardly from the member 39 so that when the bar 16 is adjusted outwardly, the shafts 48 will be supported as the member 39 is moved in unison with the bar 16. The uprights 36, 37 and 38 are provided with a vertically disposed support 50, having a bearing 51 at the upper end and journaled in the bearings 51 are longitudinally extending shafts 52 provided with worms 53, which mesh with the worm gears 45. The shafts 52 have hand wheels 54 to enable the convenient revolving of the shafts 52 whereby the worm gears 45 will be revolved and the bearings 43 adjusted.

Mounted upon the bars 14 and 19 in proximity to each end of said bars, is an upright 55, and each of said uprights 55 is formed with a vertically disposed pocket 56 having extending into the mouth thereof an interiorly threaded flange sleeve 57. The flange of each of the sleeves 57 is indicated at 57a, which engages the top edge of its respective upright 55. The sleeve 57 is fixedly secured to its respective upright 55.

Mounted upon the uprights 55 are longitudinal members 59 and 60 and attached to said members near each end thereof is the base plate 61 of a bracket, the latter having bearings 62 and 63. The brackets of each member are oppositely disposed with respect to each other and in each bearing 62 is arranged a worm gear 64 carried by a vertically disposed screw 65a, which extends through the bearing 62 of its respective member 59 and 60 and engages with the threads of the sleeve 57 and extends into the pocket 56. Journaled in the bearing 63 are longitudinally extending shafts 65, each provided with a pair of worm gears 66 which mesh with a pair of worm gears 64. Each of the shafts 65 is provided with a hand wheel 67. By turning the wheel 67 the shaft 65 will revolve and as the worms 66 mesh with the worm gear 64, it is obvious that the screws 65a will be revolved and the members 59 and 60 be elevated or lowered, depending upon the direction of movement of the screws 65a.

Journaled in the bars 14 and 19, are the spindles 68 of transversely extending rolls 69. The spindles 68 project from one side of the bar 19, and which enables the rollers to be supported when the bar 19 is adjusted toward the member 13.

Connected to the member 59 is a pair of inwardly extending transversely disposed supports 70 having attached thereto the ends of a longitudinally extending resilient bracing element 71 for the purpose of maintaining the boxes or cartons upon the rollers 69 as they are conveyed through that portion of the machine in which the flaps are provided with glue.

Arranged between the uprights 55 are box flap opening and closing members and which are arranged in pairs. Each of the flap opening members of the pair consists of a pair of longitudinally disposed oppositely extending inclined bars 72 and 73, the former inclining upwardly and the latter downwardly. The forward ends of the said bars are inset as at 74 and pivotally connected together as at 75. The rear ends of said bars are bent outwardly at right angles as at 76. The rear end of the bars 72 are provided with an upright portion 78 which are fixedly secured to the members 59 and 60, as at 79. The rear ends of the bar 72 are bent downwardly as at 80 and are fixedly secured to the bars 14 and 19 as at 81. The flap closing members extend in an opposite direction with respect to the flap opening members and a pair of flap closing members is employed and each flap closing member consists of a pair of bars 82 and 83, having their rear ends pivotally connected as at 84. The bars 82 have their forward ends fixedly secured to the members 59 and 60 as at 85 and the bars 83 have their forward ends fixedly secured to the bars 14 and 19 as at 86. The bars 82 are of compound curvature and incline downwardly toward the rear end of the machine while the bars 83 are of compound curvature and incline upwardly toward the rear end of the machine. The rear ends of the bars 82 and 83 are positioned inwardly with respect to the forward ends thereof.

By pivotally connecting the bars 72 and 73 together, the bars 82 and 83 together, it is obvious that provision is made to allow of the adjusting of the members 59 and 60 upwardly and downwardly when occasion so requires and furthermore it provides for the positioning of the forward ends of the flap openers and rear ends of the flap closers centrally of that portion of the machine which is employed for applying glue to the flaps of the boxes or cartons. Connected to the bar 13 is a support 87 in which is arranged a vertically adjustable arm 88 having an inwardly extending upper portion 89 and carrying a glue applying brush 90, the latter being arranged over the rollers 69 at one end thereof. The arm 88 is maintained in its adjusted position by a set screw 91. Mounted upon a base 92 which projects from the bar 14 is a vertically disposed support 93, in which is arranged a vertically adjustable arm 95 having an inwardly extending portion 95 carrying a glue applying brush 96, the latter being arranged opposite the brush 90. The arm 94 is maintained in an adjusted position by a set screw 97. The reference characters 98 and 99 denote glue supply pipes having their outlet ends 100 thereof arranged over the brushes 90 and 96. Each of the supply pipes is provided with a cutoff 101.

The rolls 69 as well as the rolls 35 are provided centrally with a peripheral groove 102, and cog teeth 103 within said groove. The reference character 104 denotes an endless belt which passes through the groove 102 of the rollers and engages the teeth 103 for revolving the rollers. The belt 104 is provided with lugs 105, which abut against the packets or cartons for conveying these latter through the machine.

The spindle 68, of the rollers 69 at the front end of the machine is extended as at 106 and with the said extended end a driving means 107 is connected. When the said roller 69 which is arranged at the forward end of the machine is driven, the belt 104 is operated and all of the rollers 69 and 35 are revolved. The belt 104 extends around the rollers 69 and 35.

It will be assumed that a box provided with flaps has been fed to the front end of the machine, from a suitable conveying mechanism and that the belt 104 is operating. The flap openers are so positioned that they will engage and extend the flaps of the box so that as the box is conveyed through the machine the inner faces of the flaps will be carried over the glue applying rollers and glue will be supplied to the inner face of the flaps. As the box is fed to the machine through the medium of the belt 104 and lugs 105, the flaps will be moved against the body of the box and as the box is further conveyed through the machine, it will be engaged by the rollers 47 and the flaps will be sealed against the body portion of the box. That portion of the machine in which is arranged the glue applying brushes is adjustable to provide for various sizes of cartons in view of the fact that the bar 19 and member 60 are laterally adjustable and member 60 vertically adjustable and that that portion of the machine in which is arranged the rollers 47 also has provision to provide for different size boxes owing to the fact that the bar and member 39 are laterally adjustable and the member 39 vertically adjustable.

What I claim is:—

1. A box flap gluing and sealing machine comprising a flap extending and closing mechanism, means for laterally and vertically adjusting said mechanism, a box flap sealing mechanism, means for vertically and laterally adjusting said sealing mechanism, glue applying means associated with said box flap extending and closing mechanism, means for conveying a box through said mechanisms, and resilient and rotatable retaining elements for the box while being conveyed.

2. A box flap gluing and sealing machine comprising adjustable flap extenders, adjustable flap closers arranged in operative relation with respect to the extenders, glue applying devices positioned between the extenders and closers, two sets of flap sealing elements, means for laterally adjusting one of said sets, means for conveying a box to be engaged by said extenders, openers and elements, resilient and rotatable retaining elements for the box while being conveyed, said rotatable retaining elements formed of two sets, means for vertically adjusting said resilient retaining element, and means for vertically adjusting one of the sets of said rotatable retaining elements.

3. A box flap gluing and sealing machine comprising flap extenders, flap closers, means for applying glue to the flaps after extended and prior to the action of the closers upon the flaps, means for conveying a box to have its flap acted upon by said extenders, glue applying means and closers, a sealing mechanism arranged rearwardly of said closers and including two sets of rotatable sealing elements, means for adjusting one of said sets, retaining elements for said box while being conveyed, and means for vertically adjusting said retaining elements.

4. A box flap gluing and sealing machine comprising an upper and a lower set of transversely extending rollers, two sets of vertically disposed rollers, box flap opening-glue applying and box flap closing mechanism arranged in advance of said rollers, means for laterally and simultaneously adjusting said mechanism and one set of vertical rollers, and means for vertically adjusting said upper set of transverse rollers.

5. A box flap gluing and sealing machine comprising an upper and a lower set of transversely extending rollers, two sets of vertically disposed rollers, box flap opening-glue applying and box flap closing mechanism arranged in advance of said rollers, means for laterally and simultaneously adjusting said mechanism and one set of vertical rollers, means for vertically adjusting said upper set of transverse rollers, and means for conveying a box through said mechanism and between said sets of rollers.

6. A box flap gluing and sealing machine comprising an upper and a lower set of transversely extending rollers, two sets of vertically disposed rollers, box flap opening-glue applying and box flap closing mechanism arranged in advance of said rollers, means for laterally and simultaneously adjusting said mechanism and one set of vertical rollers, means for vertically adjusting said upper set of transverse rollers, means for conveying a box through said mechanism and between said sets of rollers, and a box retaining element associated with said mechanism.

7. A box flap gluing and sealing machine comprising an upper and a lower set of transversely extending rollers, two sets of vertically disposed rollers, box flap opening-glue applying and box flap closing mechanism arranged in advance of said rollers, means for laterally and simultaneously adjusting said mechanism and one set of vertical rollers, means for vertically adjusting said upper set of transverse rollers, means for conveying a box through said mechanism and between said sets of rollers, a box retaining element associated with said mechanism, and means for vertically adjusting said retaining element, openers and closers of said mechanism.

In testimony whereof I affix my signature in the presence of two witnesses.

CHARLES W. CASTO.

Witnesses:
James A. Magill,
Grant E. Hess.